Sept. 10, 1968     U. H. MARTENSEN     3,400,673
SEEDING ATTACHMENT FOR IMPLEMENT
Filed Jan. 17, 1966                                   2 Sheets-Sheet 1
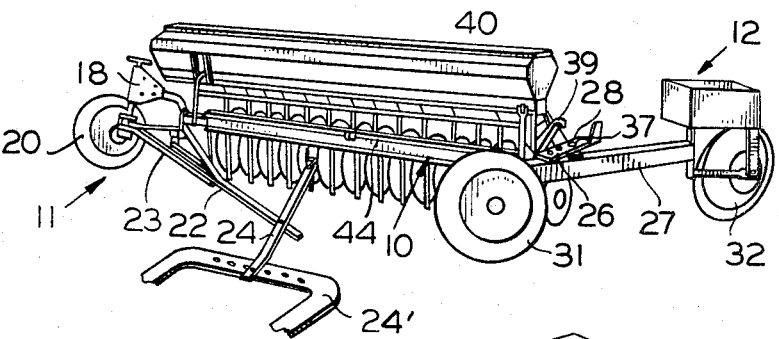
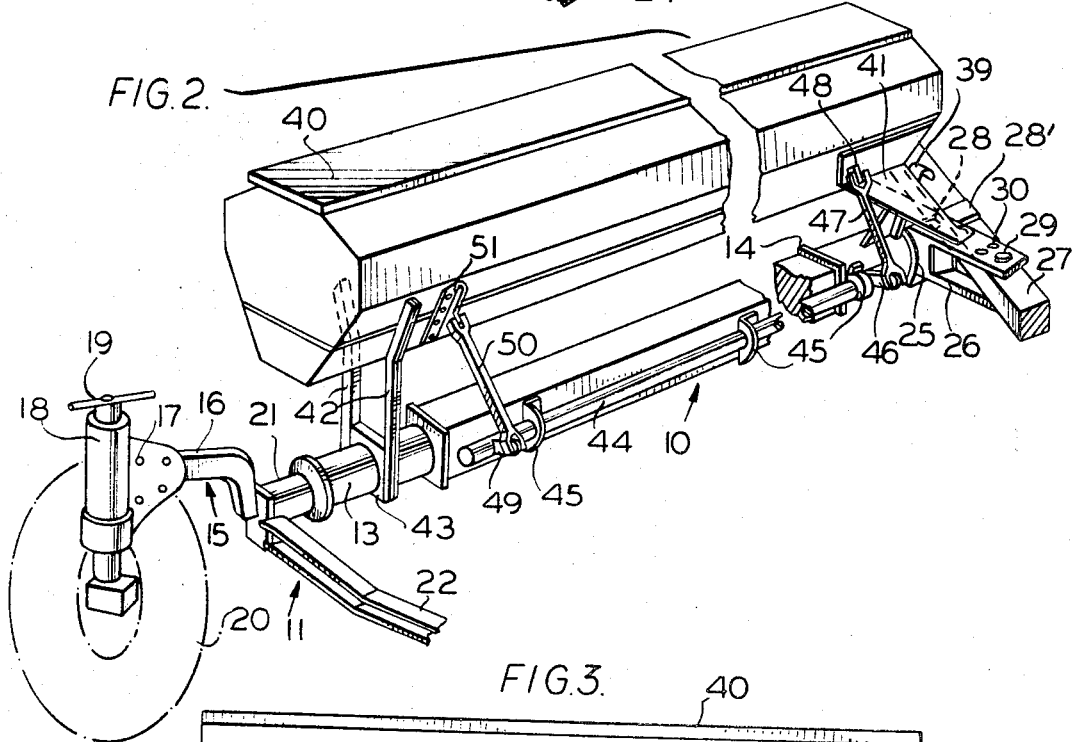
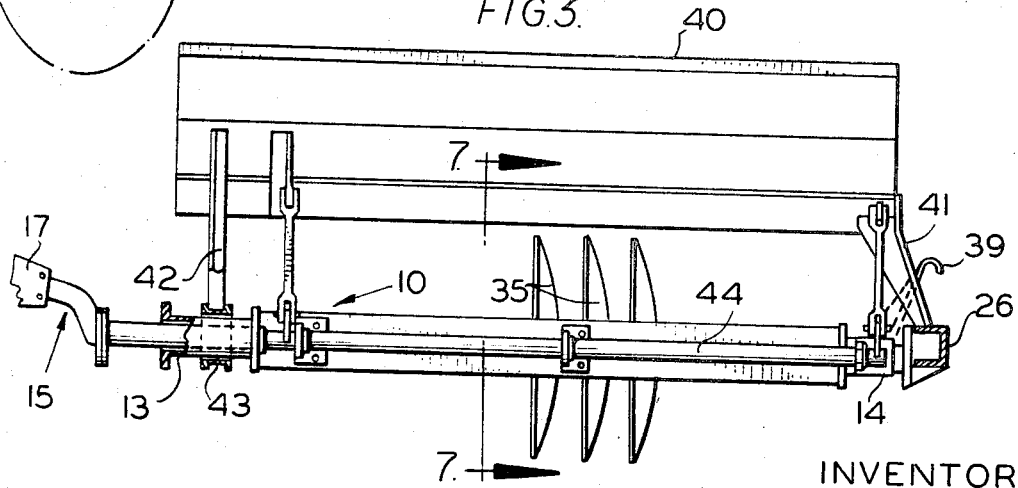
INVENTOR
UWE H. MARTENSEN
ATT'Y Sept. 10, 1968  U. H. MARTENSEN  3,400,673
SEEDING ATTACHMENT FOR IMPLEMENT
Filed Jan. 17, 1966  2 Sheets-Sheet 2

INVENTOR
UWE H. MARTENSEN
ATT'Y

United States Patent Office 3,400,673
Patented Sept. 10, 1968

3,400,673
SEEDING ATTACHMENT FOR IMPLEMENT
Uwe H. Martensen, Buenos Aires, Argentina, assignor to International Harvester Company, Chicago, Ill., a corporation of Delaware
Filed Jan. 17, 1966, Ser. No. 521,061
8 Claims. (Cl. 111—70)

This invention relates to agricultural implements and particularly to implements of the disk tiller type. More specifically, the invention concerns novel means for mounting a material-dispensing hopper on an implement frame.

An implement of the type referred to, such as a harrow plow, consists of an elongated, diagonally-extending frame member or tool beam supported at its front end by a furrow wheel and by a hitch connection to the propelling tractor, and at its rear end by a wheeled truck carrying a land wheel and a rear furrow wheel. The tool beam is rotatable with respect to its front and rear supports and the disks carried by the beam are raised and lowered by rocking the beam. Since the position of the front wheel support is affected by the movement of the hitch and the tractor, the mounting of a hopper for seed and the like on such an implement has caused stresses in the implement to be transmitted to the hopper, rendering it unstable. Therefore, an object of this invention is the provision of novel means for mounting a hopper for seed or the like on an implement of the type referred to.

Another object of the invention is the provision, in a harrow plow or the like having a tool-carrying frame member rotatable to raise and lower the tools, of novel means for mounting and stabilizing a hopper for seed and the like on the plow.

Other objects and advantages of the invention will become clear from the following detailed description when read in conjunction with the accompanying drawings, wherein:

FIGURE 1 is a diagrammatic view in perspective of a harrow plow having a seed hopper mounting incorporating the features of this invention;

FIGURE 2 is an enlarged view in perspective, with parts removed and partly in section of a portion of the implement of this invention;

FIGURE 3 is a sectional view in side elevation, with parts removed, of a portion of the structure shown in FIGURE 2, and on a smaller scale;

Figure 4:
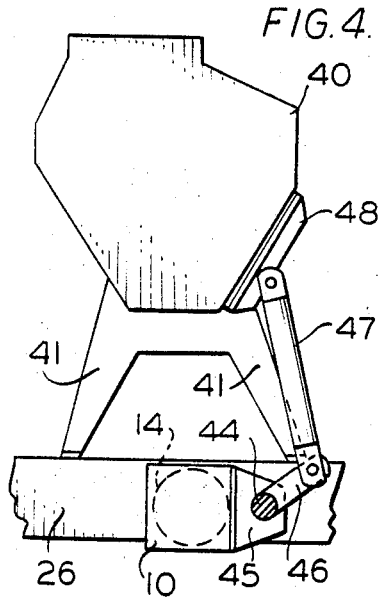
FIGURE 4 is a diagrammatic end view of the structure shown in FIGURE 3.

In the embodiment of the invention illustrated in the drawings, a harrow plow is shown as including a main tool-carrying frame 10 extending diagonally of the direction of travel and supported at its axially front and rear ends by wheeled supporting means 11 and 12, respectively. For the greater portion of its length, main frame 10 is substantially rectangular in cross-section and is provided at its front and rear ends with cylindrical extensions 13 and 14, respectively. A wheel-carrying member 15 forms part of the front support 11 and includes an angled bar 16 to the forward end of which is secured a plate 17 affixed to a vertical sleeve 18 rotatably carrying a spindle 19 upon the lower end of which is mounted a front furrow wheel 20.

Wheel-carrying member 15 also includes a rearwardly-extending spindle section 21 received in extension 13 of main tool-carrying frame 10. A bar 22, connected to tool-carrying member 15 forms, along with another bar 23, indicated in FIGURE 1, connected to the lower end of spindle 19, and a bar 24 connected to the central portion of frame 10 in a manner not shown, part of a hitch structure by which the implement is connected to tractor drawbar, indicated at 24'.

The rearward extension 14 is rotatably received in a bearing 25 carried by a bracket 26. This support also includes a beam 27 connected by a pivot bolt 28 to a plate 28' affixed to member 26, beam 27 being held in place by a bolt 29 optionally receivable in one or more additional openings 30 to hold beam 27 in a selected angularly adjusted position. At one end of beam 27 is mounted a land wheel 31, and at its other end a rear furrow wheel assembly 32.

Beam 27 and wheels 31 and 32 provide a wheeled truck for the rear end of the implement and serve as a relatively stationary support for the rear end of tool-carrying frame 10. The supporting means 11 and the hitch connection of the implement to the vehicle by which it is propelled also constitutes a relatively stationary support for the forward end of the tool-carrying beam.

Figure 6:
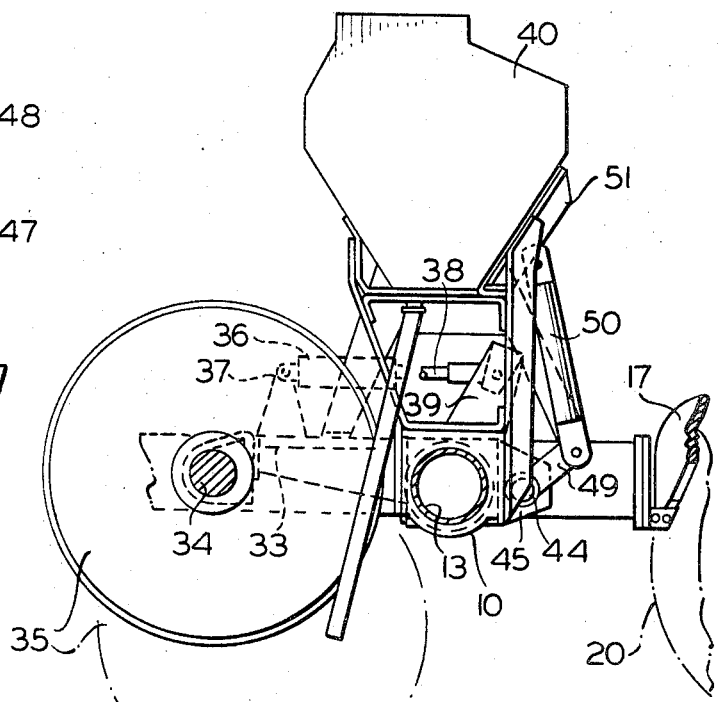
FIGURE 6 is a sectional view, on an enlarged scale, as viewed from the left in FIGURE 3.

The rectangular portion of main frame member 10 has secured to the rear side thereof and projecting rearwardly therefrom in diagonal planes, arms 33 rotatably supporting at their ends a shaft 34 upon which are mounted a plurality of earth-working disks 35. Main frame member 10 is rockable about its axis to vertically move disks 35 from an operating position such as is indicated in dotted lines in FIGURE 6 to the solid line transport position thereof, and this is accomplished by the provision of a hydraulic cylinder 36 anchored to an upright 37 affixed to member 26 of the relatively stationary rear supporting means 12, and having a piston rod 38 slidable therein and pivotally connected to an arm 39 secured to tubular extension 14 of the main frame. Fluid under pressure is preferably supplied to the cylinder 36 from the vehicle by which the implement is propelled to raise and lower the disks 35 by operation of the cylinder, but it may be understood that other power-transmission means may be provided for reacting between the relatively stationary member 26 and frame member 10 to rock the latter about its axis.

An elongated hopper for grain and the like 40 is provided for the harrow plow of this invention and extends above and parallel to main frame 10 substantially the full distance between the front and rear supporting means 11 and 12, and has rigidly secured to its lower portion and extending downwardly therefrom depending legs 41 rigidly affixed to cylinder-supporting bracket member 26.

Near the forward end of hopper 40 a pair of struts 42 are affixed and depend therefrom and have secured to their lower ends a bearing member 43 in which the forward cylindrical extension 13 is rotatably supported.

Since the hopper 40 is mounted at one end on the cylinder anchor bracket 26, which does not participate in the angular adjustment of the wheeled truck beam 27, and the forward end of the hopper receives its vertical support from the tool-carrying frame 10 which is rotatable with respect to the hopper, a relatively stable mounting for the hopper is provided. Since the front furrow wheel is supported by the hitch connection of the implement to the tractor and follows the up-and-down movement thereof, as well as pivoting about the axis of the main frame 10, the mounting of the front end of the hopper upon the tool-carrying beam itself leaves the hopper unaffected by these motions. In order to neutralize torque forces in hopper 40 due to its mounting, a torsion bar 44 is rockably mounted in a plurality of bearings 45 secured to the forward face of the rectangular portion of frame member 10 and is provided at one end with an arm 46 affixed to bar 44 and projecting forwardly therefrom, the end of arm 46 being pivotally connected to one end of a link 47, the other end of which is pivotally connected to a lug 48 affixed to hopper 40. The other end of bar 44 has an arm 49 affixed thereto parallel to arm 46 and pivotally connected to one end of a link 50, the other end of which is pivotally connected to a lug 51 secured to the hopper. Links 47 and 50, acting through torsion bar 44, operate to stabilize torque forces acting on the hopper throughout the range of rocking movement of frame member 10 in raising and lowering the earth-working disks, torsion bar 44 revolving with member 10 about its axis and the positions of the parts being illustrated in FIGURE 7.

It should be understood that the rigid-supporting legs 41 are capable of absorbing the components of forces acting in any direction, whereas struts 42 at the opposite end of the hopper, due to the mounting on the rotatable frame member 10, can only absorb vertical forces. Struts 42 are incapable of absorbing the non-vertical components represented by the weight of the hopper relative to the travelling frame, such as may be induced by inequalities of level in the ground. The function of the torsion bar 44 is to resist such accidental force components, transferring them to the rigid-supporting legs 41. Thus, deformation of the hopper structure is avoided and the hopper is stabilized in its normal working position. The end of bar 44 adjacent arm 46 will be retained in fixed position, and due to its resistance to torque, the opposite end of the torsion bar will also be stabilized, absorbing nonvertical components through the stabilizing link 50 and its connection 51 to the hopper.

Figure 7:
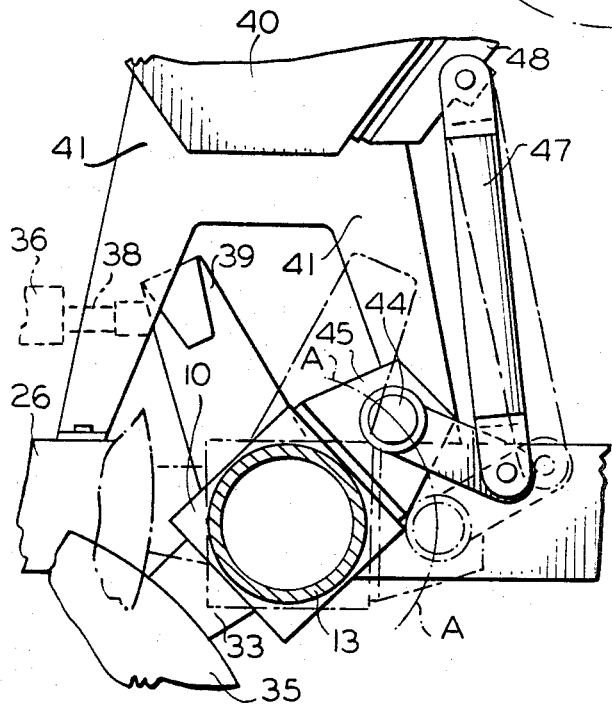
FIGURE 7 is an enlarged sectional view taken on the line 7—7 of FIGURE 3.
Figure 5:
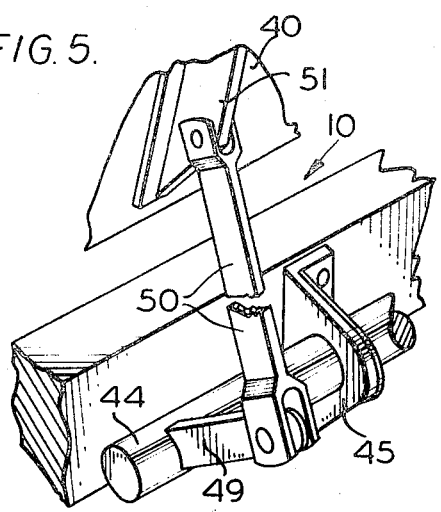
FIGURE 5 is an enlarged detail of a portion of the structure shown in FIGURE 2.

When the frame member 10 is rotated to raise or lower the disks 35, torsion bar 44 follows the arc A—A, as indicated in FIGURE 7, rotating in bearings 45 without affecting the function of the torsion bar. Details of the torsion bar mounting are shown in FIGURE 7, the relative positions of the parts in solid lines being shown with the disks 35 in working position. The position of the parts corresponding to the raised position of the disks is shown in dotted lines. In both positions, the connection of the stabilizing links 47 and 50 to the hopper 40 is unchanged.

It is believed that the construction and operation of the novel seeding attachment of this invention will be clearly understood from the foregoing description. It should likewise be understood that the invention has been described in its preferred embodiment and that modifications may be made therein without departing from the spirit of the invention or the scope of the appended claims.

What is claimed is:

1. An implement comprising an elongated main frame extending diagonally of the direction of travel and having earth-working tools mounted thereon, front and rear relatively stationary supporting means for the ends of said main frame, means operatively connecting the ends of said main frame to the respective of said front and rear supporting means to accommodate axial rotation of said main frame relative thereto, motion-transmitting means mounted on one of said relatively stationary supporting means and operatively connected to said main frame to rotate the latter about its axis to raise and lower said tools, a material-dispensing hopper generally parallel to said main frame, means mounting one end of said hopper on one of said supporting means, and bearing means forming a connection between the other end of the hopper and said main frame to support the hopper on the main frame while accommodating rotation of said main frame relative to said hopper.

2. The invention set forth in claim 1, wherein said rear supporting means includes bracket means to which the associated end of said hopper is affixed and on which the rear end of said main frame is rotatably mounted and a wheeled truck secured to said bracket means for adjustment to selected positions relative thereto about a generally vertical axis.

3. The invention set forth in claim 2, wherein an arm is affixed to said main frame adjacent the rear end thereof and an extensible and retractable power transmission member is mounted on said bracket means and connected to said arm.

4. The invention set forth in claim 1, wherein a torsion bar is rotatably mounted on said main frame parallel thereto, and arms are affixed to said bar adjacent the ends thereof and connected to said hopper, whereby torque forces applied against one end of said hopper are transmitted to the other end thereof to stabilize said hopper.

5. The invention set forth in claim 4, wherein link means pivotally connect said arms to said hopper and accommodate rotation of said torsion bar about the axis of said main frame.

6. The invention set forth in claim 1, wherein the means mounting one end of the hopper on said rear supporting means comprises strut means depending from the hopper and secured thereto and to said supporting means and additional strut means are secured to and depend from the hopper near its other end, said additional strut means including a bearing section at its lower end rotatably receiving said main frame.

7. The invention set forth in claim 6, wherein the tool-carrying portion of the main frame is rectangular and the portion thereof received in said bearing section is cylindrical.

8. The invention set forth in claim 7, wherein said front supporting means includes a wheel-carrying member having a rearwardly extending spindle section and said cylindrical portion of the main frame rotatably receives said spindle section.

References Cited

UNITED STATES PATENTS 2,216,423 10/1940 Scott _____ 111—75
2,960,170 11/1960 Cantral _____ 172—776

ABRAHAM G. STONE, *Primary Examiner.*

S. C. PELLEGRINO, *Assistant Examiner.*